June 2, 1925.

C. H. R. HOWE 1,539,842

MACHINE FOR FORMING GLASS ARTICLES

Filed Aug. 10, 1922 6 Sheets-Sheet 1

INVENTOR.
Charles H. R. Howe
by C. M. Clarke
Atty

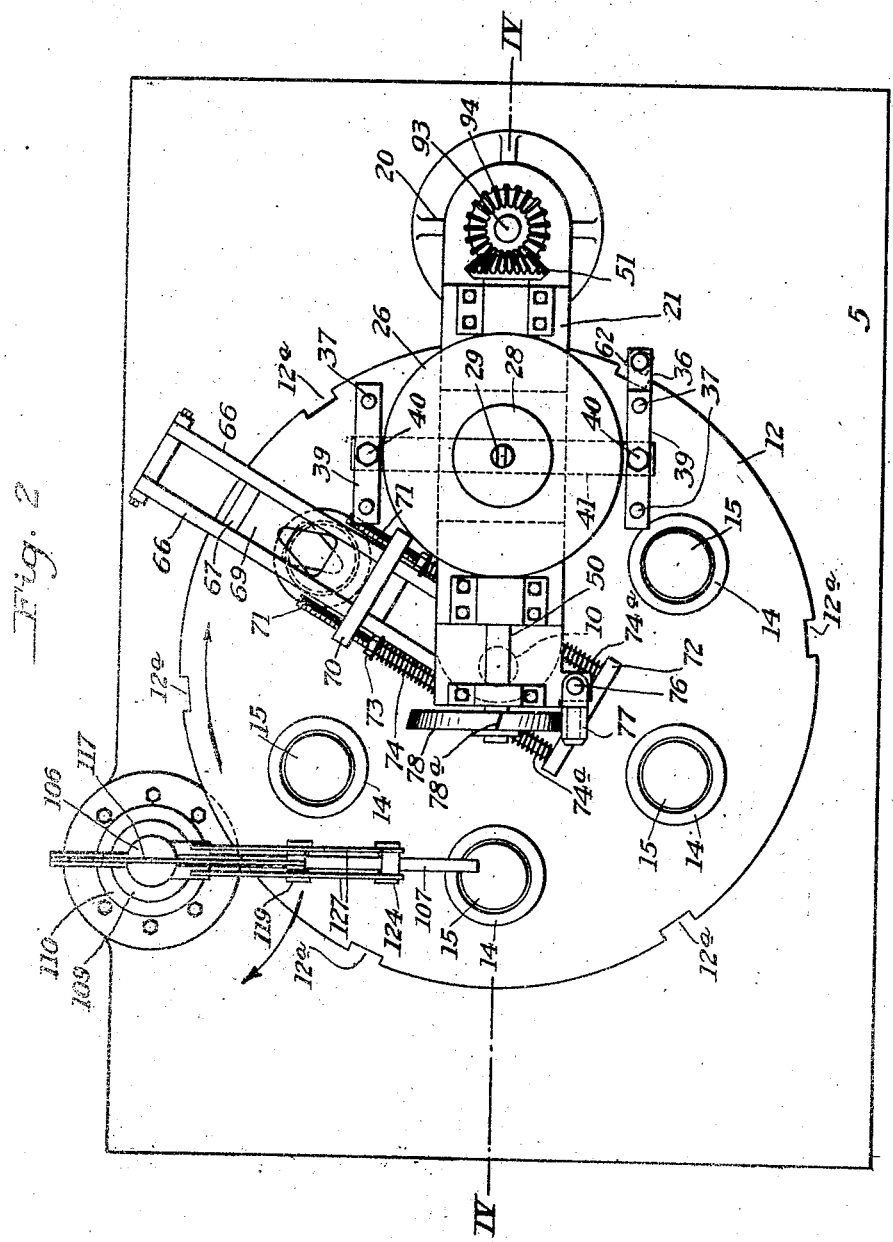

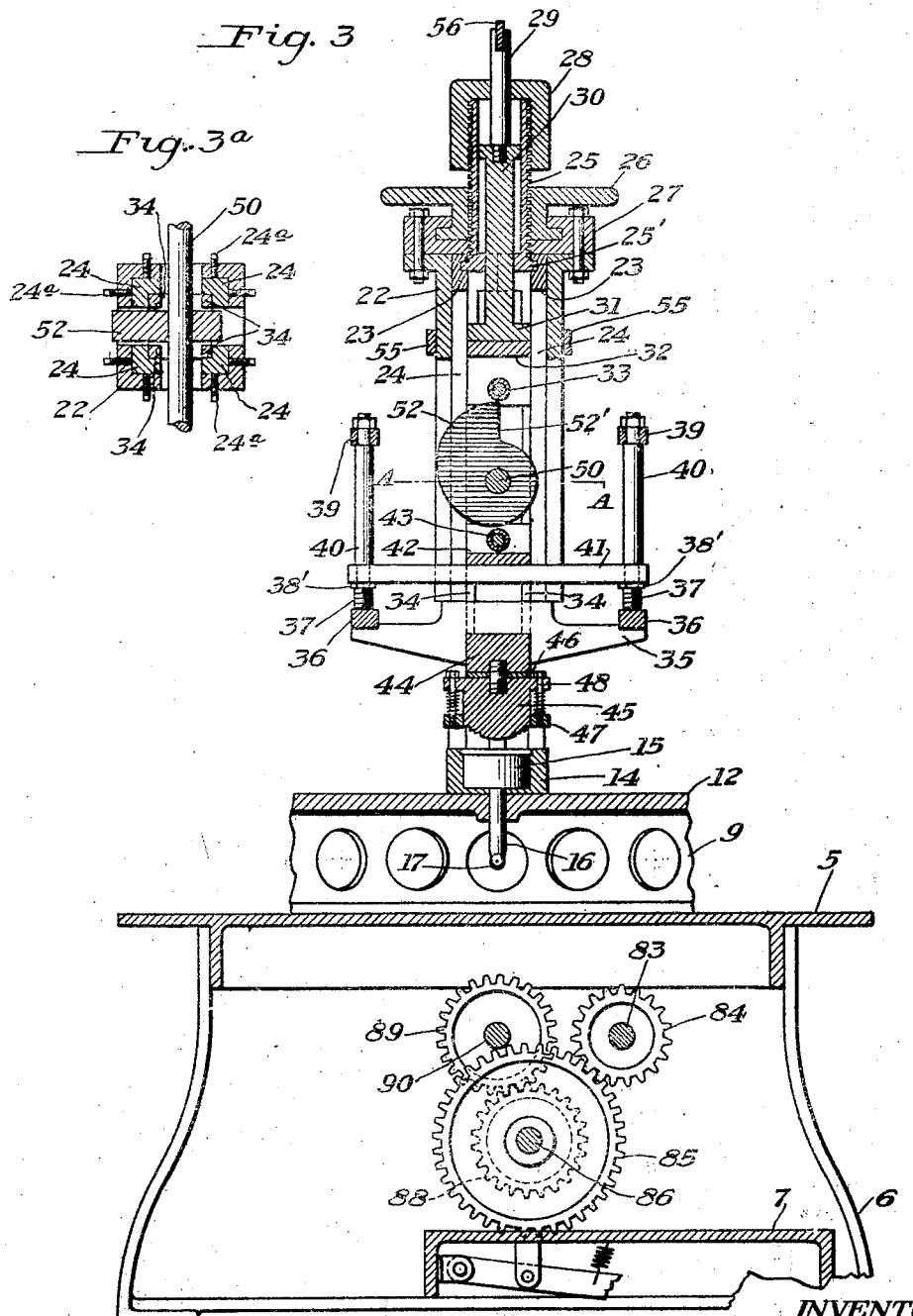

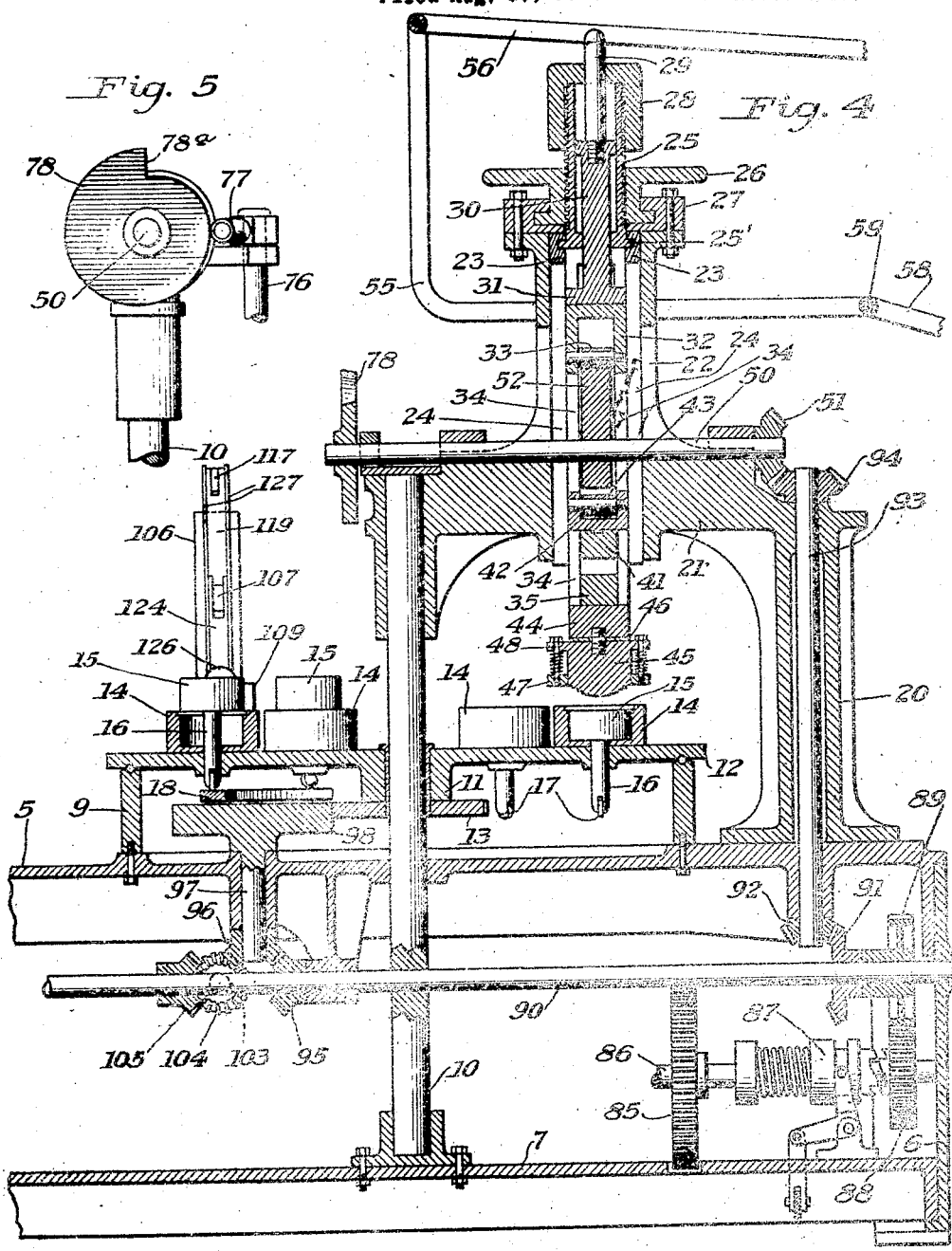

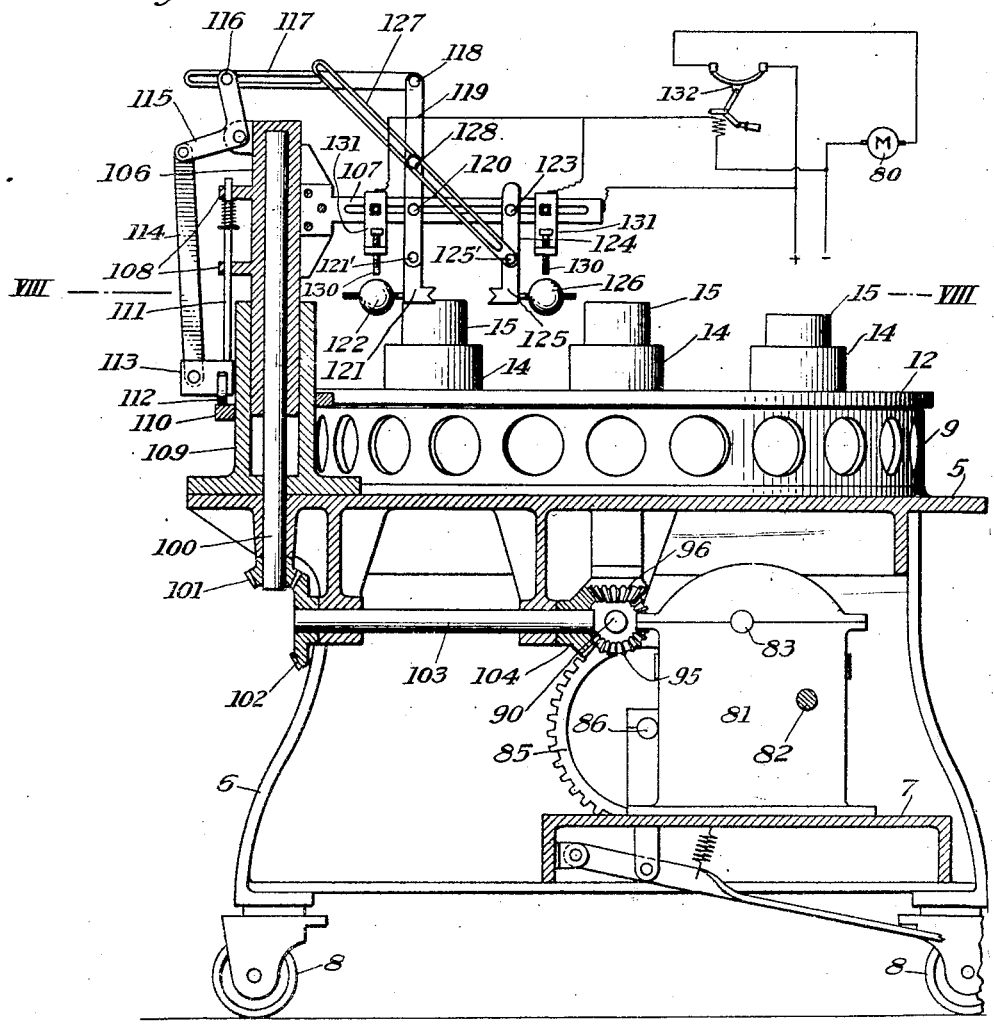
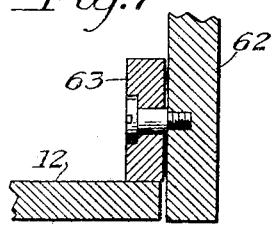

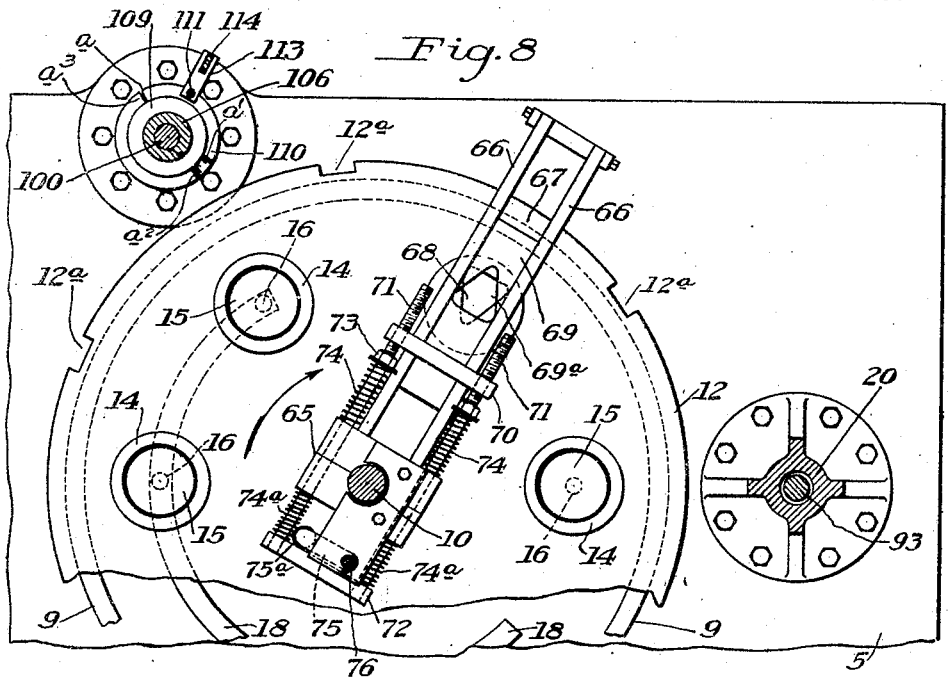
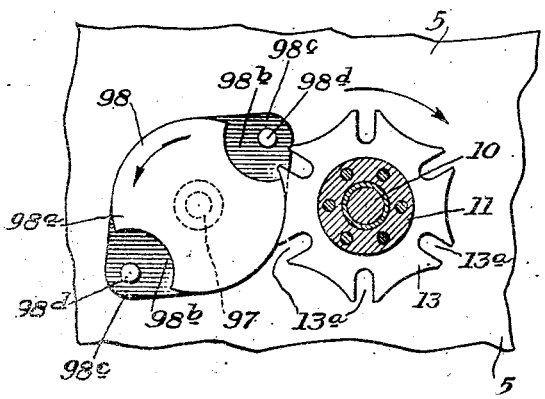
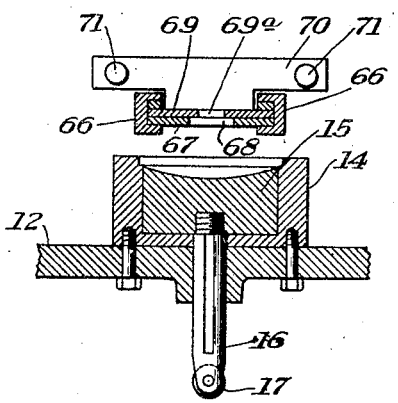

Patented June 2, 1925.

1,539,842

UNITED STATES PATENT OFFICE.

CHARLES H. R. HOWE, OF PITTSBURGH, PENNSYLVANIA.

MACHINE FOR FORMING GLASS ARTICLES.

Application filed August 10, 1922. Serial No. 581,018.

*To all whom it may concern:*

Be it known that I, CHARLES H. R. HOWE, a citizen of the United States, residing at Pittsburgh, in the county of Allegheny and State of Pennsylvania, have invented certain new and useful Improvements in Machines for Forming Glass Articles, of which the following is a specification.

This invention is for a pressing machine particularly adapted for making pressed glass articles, such as lenses for railway lamps or automobile lamps, or other small wares.

The invention relates to that type of machine in which a series of molds is mounted on a traveling carrier, such as a rotating table, and the molds are successively passed under a press by an intermittent movement of the table. After the pressed article is formed, the mold is presented to a stripper which removes the finished articles therefrom. A shear may be associated with the mechanism for shearing gobs of glass from a punty held over a mold prior to its movement to the press.

The present invention has for one of its principal objects to provide an improved means for operating the table, intermittently.

Other objects are to provide an improved pressing mechanism, an improved shear operating means and a novel stripping mechanism, all designed to co-act in the operation of the machine, without complicated mechanisms, so that the machine may be built at a low cost and will not easily get out of order.

These and other objects and advantages are obtained in the novel construction and arrangement of parts as illustrated in the accompanying drawings, in which:

Fig. 2 is a top plan view thereof;

Fig. 3 is a transverse vertical section through the machine, on the plane of line III—III of Fig. 1, but on a larger scale, part of the machine being broken away;

Figure 1:
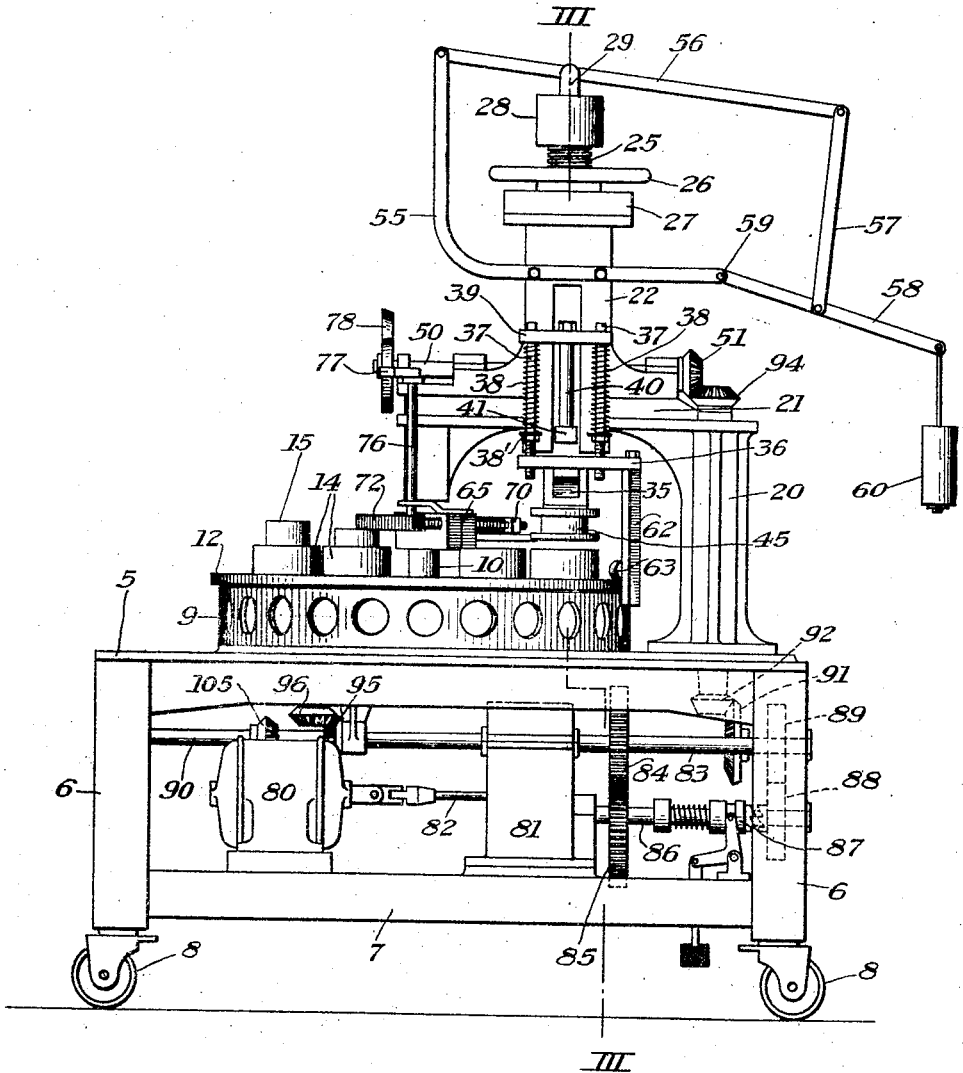
Fig. 1 is a side elevation of the machine.

Fig. 3ª is a section on line A—A of Fig. 3;

Fig. 4 is a vertical longitudinal section in the plane of line IV—IV of Fig. 2, part of the machine also being broken away;

Fig. 5 is a detail view of the cam for controlling the operation of the shear;

Fig. 6 is a vertical staggered transverse section through the machine, showing the stripping mechanism;

Fig. 7 is a detail view of a safety catch for preventing premature downward movement of the plunger;

Fig. 8 is a horizontal section of part of the machine in the plane of line VIII—VIII of Fig. 6;

Fig. 9 is a detail view of the table rotating mechanism;

Fig. 10 shows in detail a sectional view of the shear and a section through one of the molds which is positioned therebeneath.

In the drawings, 5 represents the top or bed plate of the machine, and is supported on suitable uprights 6. Spaced down from the top of the table and also carried by the legs or uprights 6 is a platform 7. The frame thus described may be mounted on castors 8 in order that it may be moved about.

Carried on the table 5 is an annular flange 9 which may be bolted or otherwise secured to the table. It is concentrically arranged about a fixed vertical supporting post 10. Having its hub 11 journaled about the post 10, is a table 12 which is supported near its periphery by the flange 9. Ball bearings may be interposed between the table and the flange, as shown in Fig. 4. Secured to the hub 11 and movable therewith is a Geneva gear wheel 13, shown in detail in Fig. 9. The table 12 is rotated through this gear by mechanism hereinafter described.

On the table 12 is an annular series of bosses or mold cups 14, there being one mold cup for each tooth on the Geneva gear. Slidable vertically in each mold cup is a mold body 15 having a rod 16 depending therefrom and passing through the table 12. The lower end of each rod 16 is provided with a roller 17 for engaging a substantially semi-circular cam 18 under the table or mold carrier 12. This cam is so arranged, as hereinafter described, to gradually lift the top of the mold bodies 15 above the tops of the receptacles 14 during a certain part of the travel of the table. At other parts of the travel of the molds the top of body 15 is below the top of the receptacles. The receptacle and the body 15 have cooperating surfaces adapted to form an article of the desired form.

On the bed 5 is an upright column 20 having a horizontal bracket 21 overhanging the table. The free end of this bracket receives and is supported by the upper end of post 10. This bracket carries a pressing plunger for cooperating with the molds for forming the glass articles. All parts of the pressing plunger, about to be described, must, therefore, be so positioned that the plunger will be centered over a mold when a mold has been moved therebeneath.

On the bracket 21 is an upright frame 22 and the bracket has an opening therein. The upright 22 is hollowed out to receive the plunger operating mechanism. Received in the hollow interior of the upright 22 are the top portions 23 of four vertical gibs 24 for providing a bearing for part of the reciprocable mechanism hereinafter described. The top portions 23 are rabbeted to receive the flanged end 25' of a threaded sleeve 25. Surrounding the sleeve 25 and threaded thereon, is a hand wheel 26 which is rotatably held against vertical movement by member 27. By turning hand wheel 26, the gibs 24 may be raised or lowered.

Threaded onto the top of sleeve 25 is a cap or nut 28 which forms a guide for rod 29 slidably passing therethrough. Rod 29, as shown, is threaded into the top of an extension 30 of a reciprocable head 31, but could be formed integrally therewith. The extension 30 of head 31 is guided in sleeve 25. On the head 31, which is slidable on the four gibs 24, is a U-shaped member 32, shown in section in Fig. 4, which carries a cam engaging roller 33.

Depending from the cross head 31 are four legs 34 (see Fig. 3ª), which bear against gibs 24. They connect at their lower ends with a cross head 35. The cross head has arms which project through the slotted frame or bracket 21, and on the outer ends of which are cross pieces 36. At each end of each of the two cross pieces is an upright bolt 37. Surrounding each bolt 37 is a compression spring 38 and a nut 38' serves to adjust the compression of the springs. Slidable on the upper end of each pair of bolts 37 and parallel with cross pieces 36, is a cross piece 39. From cross pieces 39 depend bolts 40 on the ends of a reciprocable cross head 41 above cross head 35. Cross head 41 has a U-shaped channel 42 thereon which carries a cam engaging roller 43, similar to and parallel with roller 33.

The lower face of cross head 35 is cut away so as to seat on a cross block 44 which connects the lower ends of legs 34, and to which is secured a pressing die 45. If desired, a shim may be interposed at 46. The pressing die has its lower face shaped to produce an article of the desired shape.

Surrounding the die is a ring 47 suspended from a flange on the die 45 by bolts 48 slidably passed through the flange and surrounded by pressure springs which urge the ring downwardly. The purpose of this ring is to hold the molded glass articles in the mold at the instant the plunger or die 45 begins to lift, and thereby prevent the molded article from lifting out of the mold.

Carried in suitable journals in the bracket 21 is a shaft 50 having a bevel gear wheel 51 at the outer end thereof. This shaft passes through the divided upright portion 22 of the bracket between rollers 33 and 43, and parallel therewith. On this shaft, between the rollers, is a cam 52 for effecting the reciprocable movement of the pressing plunger or die upon rotation of shaft 50. This cam has a helical face of substantially 360°, a radial shoulder 52' being formed between the portions of maximum and minimum diameter.

As the cam 52 rotates in a counter-clockwise direction, it engages roller 33 to lift cross-head 31, legs 34, cross-head 35, and plunger 45. When the shoulder 52' passes under roller 33, the entire pressing mechanism is unsupported, and may move down by gravity under certain conditions hereinafter described, with the final pressure being applied by the cam, but I prefer to provide set screws 24ª by means of which gibs 24 may be forced into frictional contact with legs 34 sufficiently to prevent the downward movement of the plunger. The cam 52 forces roller 43 downwardly thereby forcing cross bar 41 downwardly, and the cam is so shaped that the duration of constant pressure or dwell may continue as long as required for the glass to set. This in turn moves cross pieces 39 on rods 37 down against the pressure of springs 38, motion being transmitted by vertical rods 40. Springs 38, acting against nuts 38', urge rods 37 downwardly, thereby yieldably lowering cross-head 35 and the pressing die or plunger.

Another important advantage of the set screws 24ª is that they enable the gibs to be adjusted to accurately center the die or to change the vertical inclination thereof. For instance, if the set screws for two of the gibs are loosened at the top and bottom, and the set screws for the other two gibs are screwed in a similar distance, the pressing plunger will be moved laterally. By similarly adjusting the gibs at one end only, the position of the plunger may be changed. Suitable compensation for wear can thereby always be effected.

When a very quick lowering movement of the press is desired, the parts are adjusted so that the press may be lowered by gravity. A system of compound levers may be employed for increasing the pressure of the plunger. Such a system of levers is shown in the drawings. Bar 55 is bolted to the upright 22. Pivoted to the upturned end thereof is a lever 56, resting between its ends, in the bifurcated end of the upwardly extending rod 29. The free end of the lever connects with link 57. Link 57 pivotally connects with a lever 58 between the ends of said lever, said lever having one end pivoted at 59 to one end of bar 55, while a weight 60 is suspended from its other end. As shown, lever 58 has a ratio of two to one, and lever 56 has a ratio of three to one. Consequently, the pull of weight 60 is increased six times against rod 29, and the press is accordingly lowered with greater force.

While it is not necessary that the gibs 24 be adjustable vertically, this is desirable in some instances, to take up for wear or when the stroke of the press is changed by changing the size of cam 52.

In order to prevent the press from operating prematurely, and to positively hold it against downward movement prior to a mold being positioned directly beneath it, I have shown a safety device which may be employed when the cam is of the shape shown, to enable independent downward movement of the plunger. Depending from one of the cross rods 36 is a vertical rod 62, which carries a roller 63 near its lower end. Roller 63 overhangs the periphery of table 12 and may ride thereon as the table rotates. At suitable intervals in the periphery are formed notches 12$^a$ through which the roller 63 may pass. As long as roller 63 engages the periphery of table 12, bars 36 and the pressing plunger cannot be lowered. When a notch moves under the roller, the roller will allow the plunger to drop. Roller 63 entering the notch will, furthermore, hold the table from rotating. One notch is provided for each mold.

Secured to the fixed vertical post 10 is a shear which is used for cutting off gobs of glass from a punty. The shear comprises a separable block 65, non-rotatably bolted about post 10. Extending horizontally and radially outwardly from this block, is the shear supporting frame comprised of two parallel channeled bars 66. Fixed between the channel bars is a lower plate 67 having an opening 68 therein. Slidable in the channels or plates 67 is a plate 69 having an opening 69$^a$ therein. The movement of plate 69 over plate 67 to move the normally registering openings 68 and 69$^a$ out of alinement, effects the shearing of a gob of glass dropping through the openings. For effecting a sliding movement of plate 69, a cross bar 70 is secured to said plate.

Threaded into this cross-bar, near each end thereof, are rods 71 which are slidably passed through separable blocks 65. The inner ends of these rods are connected by a cross-bar 72. 73 indicates nuts on the rods 71. Interposed between nuts 73 and block 65 around rods 71 are compression springs 74. Around the inner ends of these rods, between block 65 and the cross-member 72, are weaker compression springs 74$^a$. These springs are so adjusted as to normally hold the openings in register.

The shear is operated by a rocker arm 75 having a roller 75$^a$ engaging cross bar 72. Arm 75 is keyed to the lower end of a vertical shaft 76. The upper end of shaft 76 has a radially extending cam engaging roller 77 thereon. This roller engages the face of an actuating cam 78 which is keyed to the inner end of shaft 50. The periphery of cam 78 is helical, the diameter increasing from the center outwardly, an abrupt shoulder being formed at 78$^a$. The periphery is also beveled to follow the angular movement of the roller 77, so that the roller in any position will have a flat bearing surface on the cam. As the cam rotates in a counter-clockwise direction, roller 77 is swung through an arc, partially rotating shaft 76 and swinging arm 75 in a corresponding arc. This forces cross-bar 72 outwardly, closing the shear and compressing springs 74. When the drop 78$^a$ in the cam is reached, springs 74 act to open the shear and return the parts to normal position. The springs 74$^a$ merely act as cushioning springs. The entire shear is so located relatively to the table, that when a mold is under the press, the shear will be directly over the next preceding mold, and the cam 78 is positioned so as to actuate the shear just prior to the movement of the table.

All parts of the machine are driven from a common motor 80. The motor transmits power to a standard reducing gearing inside box 81, through shaft 82. The reducing gearing transmits the power to shaft 83 on which is keyed gear wheel 84, meshing with gear wheel 85 on shaft 86. Motion from shaft 86 is transmitted through foot clutch 87 to pinion 88. Pinion 88 meshes with pinion 89 on shaft 90, which is the main power shaft of the machine.

Keyed to the shaft 90 is a bevel gear 91, meshing with a smaller bevel gear 92 on a vertical shaft 93. The ratio of gears 91 and 92 is two to one. Vertical shaft 93 passing through the upright 20, has a pinion 94 at its upper end meshing with miter gear 51 on shaft 50. Shaft 50 is thereby rotated continuously at a speed twice that of shaft 90.

Also keyed to shaft 90 is a miter gear 95. This gear meshes with gear 96 of the same number of teeth on the lower end of a short vertical shaft 97. On the upper end of shaft 97 is a wheel 98 of the shape shown in Fig.

9. It comprises a circular upper part 98ª having notches 98ᵇ in its periphery. Lugs 98ᶜ extending outwardly from the lower part of the wheel carry vertical pins 98ᵈ, which are positioned radially outward from notches 98ᵇ. These pins engage in the slots 13ª in Geneva gear wheel 13 to rotate said gear through a given arc, and thus rotate the table. The round periphery of the upper part 98ª of wheel 98 engages the concaved faces of the teeth of Geneva gear wheel 13 when the pins are out of engagement with the slots, and thereby hold the table against independent rotation and prevent the table from moving independently of the driving mechanism, so that it will move the exact distance required, and no more. As the wheel 98 carries two pins, the table will be advanced two steps with each rotation of shaft 90.

Opposite the press is a mold stripping mechanism. The cam 18 begins a short distance past the press where it has its minimum height and increases gradually to a point just past the point where the finished articles are removed. The mold bodies 15, therefore, rise gradually out of the cups 14, reaching their highest position when they are stripped. Just as they are being stripped, they drop again to the lowest position, and remain in this position while they pass under the shear and press.

The stripping device includes a vertical rotatable shaft 100 having a miter gear 101 on its lower end which meshes with a gear wheel 102 of twice the number of teeth, which is carried on shaft 103. Shaft 103 is driven from shaft 90 by bevel gears 104 and 105. The gearing is such that shaft 100 rotates in a direction opposite the direction of rotation of the table.

Keyed on the shaft 100 is a sleeve 106 which carries a horizontally extending slotted arm 107, and which has integral lugs 108 thereon opposite said arm. The lower end of the sleeve 106 is retained in an annular casing or support 109 secured to the machine bed 5. On the outside of this support is an annular cam 110 which is level from $a$ to $a'$, as indicated in Fig. 8; rises at $a'$ a slight distance, and is level from $a^2$ to $a^3$. At $a^3$ there is an abrupt drop to the lower level.

Slidable in lugs 108 is a rod 111 having a cam roller 112 on its lower end, which rides over cam 110 as the sleeve 106 is rotated. Also connected with roller 112 is a member 113, which is raised and lowered by the roller. Member 113 is pivotally connected to one end of a link 114, the other end of which is connected to one arm of a pivoted bell crank 115 carried at the top of sleeve 106. The other arm of the bell crank is connected through an adjustable pivot 116 to a horizontal link 117. The link 117 is pivotally connected at 118 with a vertical lever 119, adjustably pivoted at 120 to the horizontal arm 107. The lower end of this lever carries a jaw 121, having a flaring V-shaped terminal for gripping the edge of the ware pivoted at 121', and an adjustable balance weight 122. Adjustably pivoted to arm 107 at 123, is a second lever 124 having a jaw 125 provided with a similar terminal, pivoted thereto at 125', and an adjustable counter-weight 126. A link 127 adjustably pivoted at 128 to lever 119 and pivoted to lever 124 at 125', serves to transmit motion from lever 119 to lever 124.

In operation, as the jaws 121 and 125 move over the mold, which is brought to a stop in the path of travel of the jaws, the jaws are open. Just as the two jaws move across the diameter of the molded lens or other article, roller 112 rides over the drop $a^3$ in the cam 110, rocking the bell crank 115 and drawing link 117 laterally in a direction to swing lever 119 to move jaw 121 toward jaw 125. Link 127 transmits motion at the same time to lever 124 to move jaw 125 toward jaw 121. The two jaws thus close at diametrically opposite points on the periphery of the molded article. At the instant the jaws close on the article, the mold body 15 drops down, leaving the molded article suspended in the jaws.

The entire stripping mechanism continues to rotate, carrying the article with it, until the roller 112 encounters the rise in cam 110. This will actuate the bell crank and levers to spread the jaws, letting the article drop to a receiving chute, not shown. As the table is advanced two steps with every rotation of shaft 90, it is necessary to revolve the stripping mechanism twice to every rotation of shaft 90. Should the table be arranged to advance more steps to each revolution of shaft 90, as might easily be done by increasing the number of pins on wheel 98, two or more stripping mechanisms could be carried by sleeve 106. It is not practical to increase very much the speed of rotation of the sleeve, and for this reason, it would be better to employ more than a single stripper where the table is moved more frequently. The adjustable counter-weights on the jaws enable the jaws to normally grip an article, but to spread when an article sticks to the mold. When this happens, the article is pulled down by the mold, thereby spreading the jaws by causing them to swing on the respective pivots 121' and 125'.

If an article does stick in a mold, it is desirable that the machine stop before the mold is again charged. Consequently, I may provide vertically adjustable contacts 130, laterally adjustable on arm 107 and insulated from them, being carried on members 131. These contacts are so arranged that if one or both of the balls is moved upwardly, a circuit will be closed to a circuit breaker 132, which will open the circuit to the motor 80.

The machine is carefully assembled, so that all parts operate at the proper time, or in proper sequence. Its construction and operation is simple. Various changes and modifications may be made in the construction of the different parts of the machine within the contemplation of my invention, and within the scope of the appended claims.

I claim as my invention:

1. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a rotatable cam, and means engaging the cam for raising and lowering the press, said cam being so arranged as to enable the press to be lowered independently thereof when the cam is in a certain predetermined position.

2. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a rotatable cam, means engaging the cam for raising and lowering the press, said cam being so arranged as to enable the press to be lowered independently thereof when the cam is in a certain predetermined position, and means for forcing the plunger down after it has been raised independently of the cam.

3. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a rotatable cam, means engaging the cam for raising and lowering the press, said cam being so arranged as to enable the press to be lowered independently thereof when the cam is in a certain predetermined position, and means for holding the press against premature operation.

4. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a rotatable cam, means engaging the cam for raising and lowering the press, said cam being so arranged as to enable the press to be lowered independently thereof when the cam is in a certain predetermined position, and means depending from the press engaging the table for normally supporting the press against downward movement, and means on the table engaging said depending means for permitting downward movement of the press at proper intervals when the table is stationary.

5. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a rotating cam, means on the frame engaging the cam for lifting the press, means providing for lowering of the press independent of the cam, and means for yieldably forcing the press downwardly.

6. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a rotating cam, means on the frame engaging the cam for lifting the press, means providing for lowering of the press independent of the cam, and means engaging the cam for yieldably forcing the press downwardly.

7. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a vertical guide for said frame, vertically adjustable gibs in the frame, a cam, and means on the frame engaging the cam for lowering and raising the press.

8. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a vertical guide for said frame, horizontally adjustable gibs in the frame, a cam, and means on the frame engaging the cam for lowering and raising the press.

9. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a vertical guide for said frame, vertically and horizontally adjustable gibs in the frame, a cam, and means on the frame engaging the cam for lowering and raising the press.

10. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a vertically movable frame from which the press is suspended, a vertical guide for said frame, vertically and horizontally adjustable gibs in the frame, a hand wheel for adjusting the gibs, a cam, and means on the frame engaging the cam for lowering and raising the press.

11. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a revolving shaft, a cam on said shaft, means on the frame engaging the cam for effecting the operation of the press and permitting lowering of the press independent of the cam, another cam on said shaft, and a shear operated by said second cam.

12. A machine for forming glass articles comprising a supporting structure, a rotatable mold carrying table thereon, an annular series of molds on the table, means for intermittently rotating the table through a limited arc, a vertically reciprocable press cooperating with the molds for forming the articles as the molds are brought successively under the press, a revolving shaft, a cam on said shaft, means on the frame engaging the cam for effecting the operation of the press, another cam on said shaft for actuating shear mechanism, a rotatable rod, means on said rod engaging said shear cam for rotating said shaft through a limited arc, said cam having its periphery so beveled as to provide a true bearing for the engaging means on said shaft, and a shear operated by the rotative movement of said rod.

13. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated having a pair of pivoted depending jaws on said stripping means for gripping the opposite edge of an article on said elevated mold and removing it therefrom.

14. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, a pair of pivoted jaws depending from said stripping means for gripping the opposite edges of articles formed in the molds, means for closing the jaws when the stripper passes over the molds, and means for opening them when the article is to be discharged.

15. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, a pair of pivoted depending adjustable jaws on said stripping means having flaring terminals for gripping the opposite edges of articles formed in the molds, means for closing the jaws when the stripper passes over the molds, and means for opening them when the article is to be discharged.

16. The combination with a glass pressing machine comprising a supporting frame on which is mounted a rotatable table, a series of molds having vertically movable central portions carried by the table, means for rotating the table, a press cooperating with the molds, means for raising the central parts of the molds after they have passed under the press, of a rotating stripping mechanism adapted to pass over the molds when the central parts thereof are elevated and having a pair of depending pivoted jaws provided with edge gripping terminals arranged to engage the molded articles thereon, the central parts of the mold being arranged to drop immediately after the molded articles are engaged by said stripping mechanism.

17. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, means on said stripping means for gripping an article on said elevated mold and removing it therefrom, said central mold parts being arranged to drop immediately after the articles thereon are gripped by the stripping mechanism, and means whereby said stripping mechanism may release its grip on an article if an article should adhere to a mold.

18. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, jaws on said stripping means for gripping the articles formed in the molds, means for closing the jaws when the stripper passes over the molds, and means for opening them when the article is to be discharged, said jaws being arranged to yieldably engage the articles whereby they may be released if an article sticks to a mold.

19. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, means on said stripping means for gripping an article on said elevated mold and removing it therefrom, and means for stopping the machine if an article should stick to one of the molds.

20. The combination with a glass article forming machine comprising a supporting frame on which is mounted a rotatable table, a series of molds having vertically movable center portions on the table, means for intermittently rotating the table, a press cooperating with the molds, means for raising the central parts of the molds above the other parts after they have passed the press, of a rotating stripping means adapted to swing over the molds when the central parts are elevated, jaws on said stripping means for gripping the articles formed in the molds, means for closing the jaws when the stripper passes over the molds, means for opening them when the article is to be discharged, said jaws being arranged to yieldably engage the articles whereby they may be forced open if an article should stick to a mold, and means controlled by such forced movement of the jaws for stopping the machine.

In testimony whereof I hereunto affix my signature.

CHARLES H. R. HOWE.